United States Patent
Spears

(10) Patent No.: US 7,433,097 B2
(45) Date of Patent: Oct. 7, 2008

(54) OPTICAL IMAGE SCANNER WITH MOVEABLE CALIBRATION TARGET

(75) Inventor: Kurt E. Spears, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1038 days.

(21) Appl. No.: 10/418,932

(22) Filed: Apr. 18, 2003

(65) Prior Publication Data

US 2004/0207886 A1  Oct. 21, 2004

(51) Int. Cl.
*H04N 1/46* (2006.01)

(52) U.S. Cl. .................. 358/504; 358/505; 358/501; 358/461; 250/368

(58) Field of Classification Search ................ 358/504, 358/505, 501, 461; 250/368
See application file for complete search history.

(56) References Cited

U.S. PATENT DOCUMENTS

| | | | |
|---|---|---|---|
| 4,429,333 A | | 1/1984 | Davis et al. |
| 4,724,330 A | * | 2/1988 | Tuhro .......................... 356/614 |
| 4,970,606 A | | 11/1990 | Shima |
| 5,029,311 A | | 7/1991 | Brandkamp et al. |
| 5,101,284 A | | 3/1992 | Tanabe |
| 5,153,745 A | | 10/1992 | Brandkamp et al. |
| 5,237,172 A | | 8/1993 | Lehman et al. |
| 5,278,674 A | | 1/1994 | Webb et al. |
| 5,280,368 A | * | 1/1994 | Fullerton ..................... 358/474 |
| 5,280,388 A | | 1/1994 | Okayama et al. |
| 5,285,293 A | | 2/1994 | Webb et al. |
| 5,336,976 A | | 8/1994 | Webb et al. |
| 5,424,537 A | | 6/1995 | Lehman et al. |
| 5,508,826 A | * | 4/1996 | Lloyd et al. ................. 358/501 |
| 5,513,017 A | | 4/1996 | Knodt et al. |
| 5,753,906 A | | 5/1998 | Gennetten |
| 5,793,884 A | | 8/1998 | Farrell |
| 5,796,925 A | | 8/1998 | Deville |
| 5,907,742 A | | 5/1999 | Johnson et al. |
| 5,914,871 A | | 6/1999 | Lin et al. |
| 5,995,243 A | | 11/1999 | Kerschner et al. |
| 6,028,681 A | | 2/2000 | Gray et al. |
| 6,185,405 B1 | | 2/2001 | Sueoka |
| 6,476,394 B1 | * | 11/2002 | Amitani et al. ............. 250/368 |
| 6,768,100 B1 | * | 7/2004 | Brown .................... 250/231.13 |
| 6,947,187 B2 | | 9/2005 | Mui et al. |

(Continued)

FOREIGN PATENT DOCUMENTS

| | | | |
|---|---|---|---|
| EP | 1217822 A2 | | 6/2002 |
| GB | 2303988 A | | 3/1997 |

OTHER PUBLICATIONS

United Kingdom Search Report dated Aug. 9, 2004.

(Continued)

*Primary Examiner*—Twyler L. Haskins
*Assistant Examiner*—Micheal Burleson

(57) ABSTRACT

A scanner has a calibration target that can be moved in front of the scanline during a scan. This enables multiple calibrations during a scan. A full-color calibration can be performed during scanning without the need for a separate array of photosensors. Scanning can start as soon as the lamp provides sufficient light for scanning, without waiting for the lamp to stabilize. It is not necessary to keep the lamp on, or to keep the lamp warm.

8 Claims, 8 Drawing Sheets

U.S. PATENT DOCUMENTS 6,989,915 B2 * 1/2006 Honjo et al. ................. 358/461
2002/0176122 A1 * 11/2002 Mui et al. ................... 358/504

OTHER PUBLICATIONS

Kurt E. Spears, Optical Image Scanner With Lens Array That Are Non-Perpendicular to the Image Being Scanned. HP Pending Application 10011001-1, U.S. Appl. No. 09/842,306, filed Apr. 25, 2001, 18 pages.

Kurt E. Spears, Optical Image Scanner With Color and Intensity Compensation During Lamp Warmup. HP Pending Application 10007856-1, U.S. Appl. No. 09/772,714, filed Jan. 30, 2001, 33 pages.

* cited by examiner

OPTICAL IMAGE SCANNER WITH MOVEABLE CALIBRATION TARGET

FIELD OF INVENTION

This invention relates generally to image scanners.

BACKGROUND

Image scanners, also known as document scanners, convert a visible image on a document or photograph, or an image in a transparent medium, into an electronic form suitable for copying, storing or processing by a computer. An image scanner may be a separate device, or an image scanner may be a part of a copier, part of a facsimile machine, or part of a multipurpose device. Reflective image scanners typically have a controlled source of light, and light is reflected off the surface of a document, through an optics system, and onto an array of photosensitive devices. Transparency image scanners pass light through a transparent image, for example a photographic positive slide, through an optics system, and then onto an array of photosensitive devices. The optics system focuses at least one line, called a scanline, on the image being scanned, onto the array of photosensitive devices. The photosensitive devices convert received light intensity into an electronic signal. An analog-to-digital converter converts the electronic signal into computer readable binary numbers, with each binary number representing an intensity value.

In some configurations, the light source is a long tube providing a narrow band of light which extends beyond each edge of the document for one dimension. For electric discharge lamps, such as cold-cathode fluorescent lamps, intensity and color is a function of power and temperature. The temperature of the vapor or gas, and the phosphors, indirectly affects intensity. Because of thermal time constants in the lamp, when such a lamp is first powered on, light intensity and color vary dynamically along the length of the tube until the overall temperature of the light source stabilizes.

The time required for complete stabilization may be on the order of many minutes. Image scanners using such a light source typically wait for some stabilization before scanning the document, typically for at least tens of seconds. In general, such a delay adds additional time to every scan. Computer input/output speeds have improved, and scanner performance has improved, to the extent that scanning time and computer input/output time may be less than lamp warm-up time. As scanning times have decreased, decreasing the delay due to lamp warm-up is becoming particularly important.

Lamp warm-up is important for color accuracy, in addition to intensity. The human eye contains three different kinds of color receptors (cones) that are sensitive to spectral bands that correspond roughly to red, green, and blue light. Specific sensitivities vary from person to person, but the average response for each receptor has been quantified and is known as the "CIE standard observer." Accurate reproduction of color requires a light source that has adequate intensity in each of the spectral response ranges of the three types of receptors in the human eye. Typically, given a set of numerical values for photosensor responses for one pixel, for example, red, green, and blue, the numbers are mathematically treated as a vector. The vector is multiplied by a color transformation matrix to generate a different set of numbers. In general, the coefficients in the color transformation matrix compensate for differences between the response of photosensors and the response of the CIE standard observer, and the coefficients in the matrix may include compensation for the spectrum of the light source. See, for example, U.S. Pat. No. 5,793,884, and U.S. Pat. No. 5,753,906. An example output of the matrix is a set of coordinates in the CIE L*A*B* color space. Typically, matrix coefficients are fixed, and are obtained in a one-time factory calibration using a stable light source. With fixed matrix values, it is typically assumed that the spectrum of the light source is constant along the length of the lamp, and constant during the scan. Accordingly, it is common to wait for the lamp to stabilize before scanning to ensure that the spectrum of the illumination is close to the spectrum assumed in the matrix values.

There have been many approaches to accommodating lamp warm-up time or decreasing lamp warm-up time. Image scanners may simply wait open-loop for a worst case lamp warm-up time before initiating a scan. As one alternative to open-loop waiting, some image scanners leave the lamp on continuously. Fluorescent lamps for image scanners are relatively low power, so that continuous usage does not waste much power, but consumers may be concerned about the apparent waste of power and possible reduced lifetime.

In some scanners, the lamp is kept warm without being powered on continuously. For example, in some image scanners, the lamp is periodically turned on for a few minutes every hour during long periods of inactivity (see U.S. Pat. No. 5,153,745). In some scanners, the lamp is enclosed by a heating blanket (except for an aperture for light emission), which keeps the lamp continuously warm (see U.S. Pat. No. 5,029,311).

As another alternative, some image scanners overdrive the lamp initially to decrease the warm-up time (see U.S. Pat. No. 5,907,742; see also U.S. Pat. No. 5,914,871). In '742, the lamp current is also maintained at a low level between scans to keep the lamp warm.

Still another approach is to monitor a lamp parameter during warm-up, and delay scanning until the parameter is stable. For example, see U.S. Pat. No. 5,336,976, in which power to the lamp is monitored, and scanning is delayed until power stabilizes.

Even with a warm lamp, intensity varies along the length of the lamp. In particular, for a warm lamp, the center region of the lamp is typically brighter than the ends of the lamp. Reflective document scanners and copiers commonly have a transparent platen on which a document is placed for scanning. Reflective document scanners and copiers commonly provide a fixed-position calibration target (also called a calibration strip), along a scanline dimension, typically along one edge of the bottom surface of the platen. This calibration target is used to compensate for variation in sensitivity of individual photosensors (photo-response non-uniformity or PRNU), and for variation in light intensity along the length of the scanline. See, for example, U.S. Pat. No. 5,285,293.

PRNU is a measure of the output of each photosensor compared to the expected voltage for a particular target calibration target and light source. The calibration process compensates for at least four different factors: (1) non-uniform photosensor sensitivity, (2) non-uniform illumination, (3) cosine-fourth falloff of light at an angle relative to the optical axis of a lens, and (4) contamination in the optical path (for example, dust on a lens or other optical components). The first, third, and fourth factors are typically constant during a scan. The second factor may vary during a scan if lamp temperature has not stabilized. The primary concern of the present patent document is the variable second factor, but the PRNU calibration and compensation process includes calibration and compensation for the other factors as well.

FIG. 1 (prior art) illustrates an example of a system for performing PRNU compensation during scanning. FIG. 1 is not intended to literally represent any particular system, but instead is intended to illustrate the compensation functions being performed. In FIG. 1, a photosensor array 100 transfers charges to a charge shift register 102. Charges are serially shifted from the charge shift register 102 and converted to voltages. The resulting voltages pass through a summing junction 104 to an amplifier 106. A processor 110 has associated memory 108. Outputs from the amplifier 106 are converted by an analog-to-digital (A/D) converter 116 for reading by the processor 110. Digital outputs from the processor 110 are converted by digital-to-analog (D/A) converters 112 and 114. Before scanning, outputs from the photosensors 100 are measured, without exposure to light, to measure thermal noise (also called dark noise). The resulting digital dark noise values are stored in the memory 108. Also before scanning, the photosensors 100 are exposed to light from a calibration target, and the resulting digital values are used to compute amplifier gain values that are stored in the memory 108. Essentially, the amplifier gain values ensure that, after compensation, the outputs of the amplifier are identical for all photosensors when viewing the calibration target. Then, during scanning, stored dark noise values are converted to voltages by D/A converter 112, and the resulting voltages are subtracted from corresponding image voltages at the summing junction 104. Stored amplifier gain values are converted to voltages by D/A converter 114, and the resulting voltages are used to control the gain of amplifier 106. The resulting image voltages, with noise offset and gain compensation, are converted by A/D converter 116 and are typically then sent to a host computer, or to some other destination for storing, printing, or transmitting.

If PRNU calibration is made while the intensity of the light source is still dynamically changing, an inaccurate sensor calibration may result. As a result, even though the intensity of the light source may be stable for most of the scan, the sensors will be inaccurate for the entire scan because of inaccurate initial calibration. Accordingly, it is common to wait for the lamp to stabilize before doing the PRNU calibration.

Even after the lamp is warm, there may be some intensity variation over time. Reflective document scanners and copiers also commonly provide a second calibration target along one edge of the platen in the direction of scanning travel. This second calibration target is used to compensate for variation in lamp intensity during a scan. Essentially, it is assumed that once the lamp is warm, then relative intensity variation along the length of the lamp is constant, so it is sufficient to measure intensity near one end of the lamp. See, for example, U.S. Pat. No. 5,278,674. It is also known to monitor the color of the lamp (again, just near one end), for gain compensation. For scanners having a moving carriage, with the lamp in the moving carriage, it is also known to provide a small tab on the moving carriage for intensity monitoring at one end of the lamp. See U.S. Pat. No. 6,028,681. Similarly, for a hand held scanner, it is known to provide small intensity calibration areas within the scanner, near the ends of the light source, and the entire scanner moves relative to a document being scanned. See U.S. Pat. No. 5,995,243.

In U.S. patent application Ser. No. 09/772,714, a scanner has a calibration target that is visible to a photosensor array continuously during a scan. For example, if the lamp is in a moving carriage, the calibration target may be on the moving carriage. At least one separate array of photosensors is used to continuously monitor the intensity of the illumination, along the calibration target, during a scan.

In U.S. patent application Ser. No. 09/842,306, a scanner performs an initial calibration for lamp intensity before scanning, and a final calibration for lamp intensity after scanning. At least some compensation is performed after scanning is completed, using calibration values computed by interpolating between the initial calibration values and the final calibration values.

In U.S. patent application Ser. No. 09/842,306, a separate array of photosensors directly monitors the lamp during scanning.

There is an ongoing need to reduce the delay associated with lamp warm-up, and to provide PRNU calibration, intensity compensation, and color compensation, during scanning.

SUMMARY

A scanner has a calibration target, preferably substantially the full width of the scanline, that can be moved in front of the scanline during a scan. A full-color calibration can be performed during scanning without the need for a separate array of photosensors. Scanning can start as soon as the lamp provides sufficient light for scanning, without waiting for the lamp to stabilize. It is not necessary to keep the lamp on, or to keep the lamp warm.

DETAILED DESCRIPTION

Figure 2A:
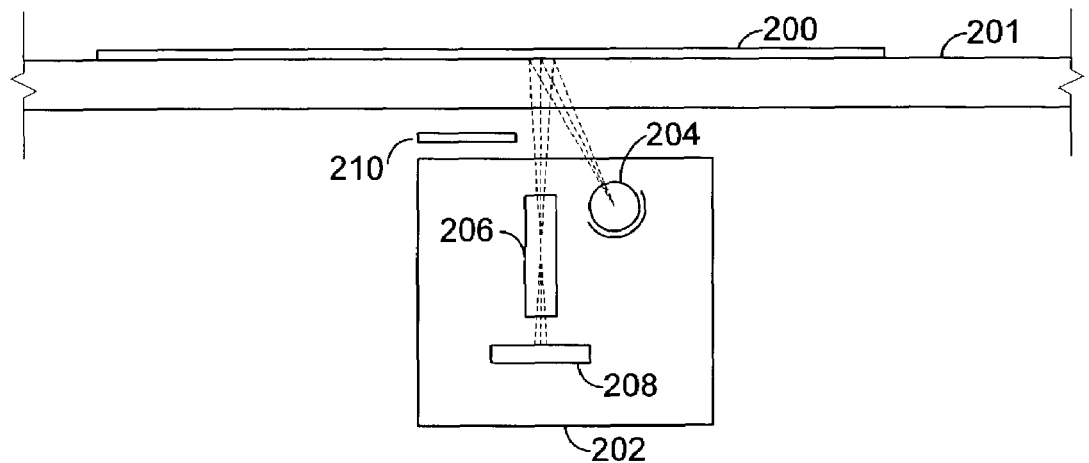
FIG. 2A is a simplified cross section block diagram of an example embodiment of a scanner with a moveable calibration target, where the moveable calibration target is positioned to allow image scanning.
Figure 2B:
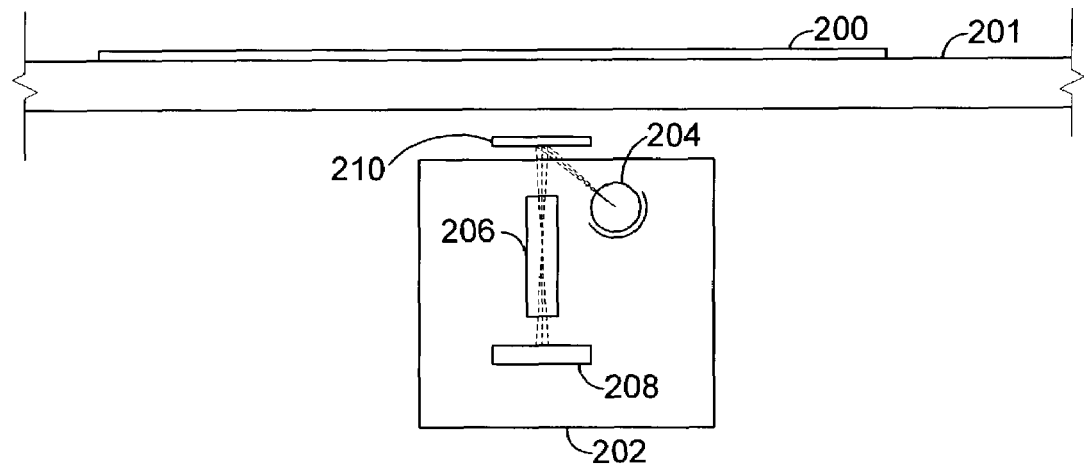
FIG. 2B is the scanner of FIG. 2A, with the calibration target positioned for calibration.

In FIG. 2A, a document 200 is positioned face down on a transparent platen 201 of a scanner. An optical head 202 (also known as a carriage) includes an light source 204, a rod lens array 206, and a photosensor assembly 208. Light rays from the light source 204 are diffusely scattered along one or more scanlines on the face of the document, through the rod lens array, and are focused by the rod lens array onto the photosensor assembly. A calibration target 210 is moveable. In FIG. 2A, the calibration target is positioned to permit scanning of the document. In FIG. 2B, the moveable calibration target 210 has been positioned so that light received by the photosensor assembly 208 is light scattered from the calibration target. It is not necessary for the calibration target 210 to be precisely focused at the photosensor assembly 208. The calibration target 210 is preferably gray or white, and preferably has a luminance factor that is uniform and known.

Figure 2C:
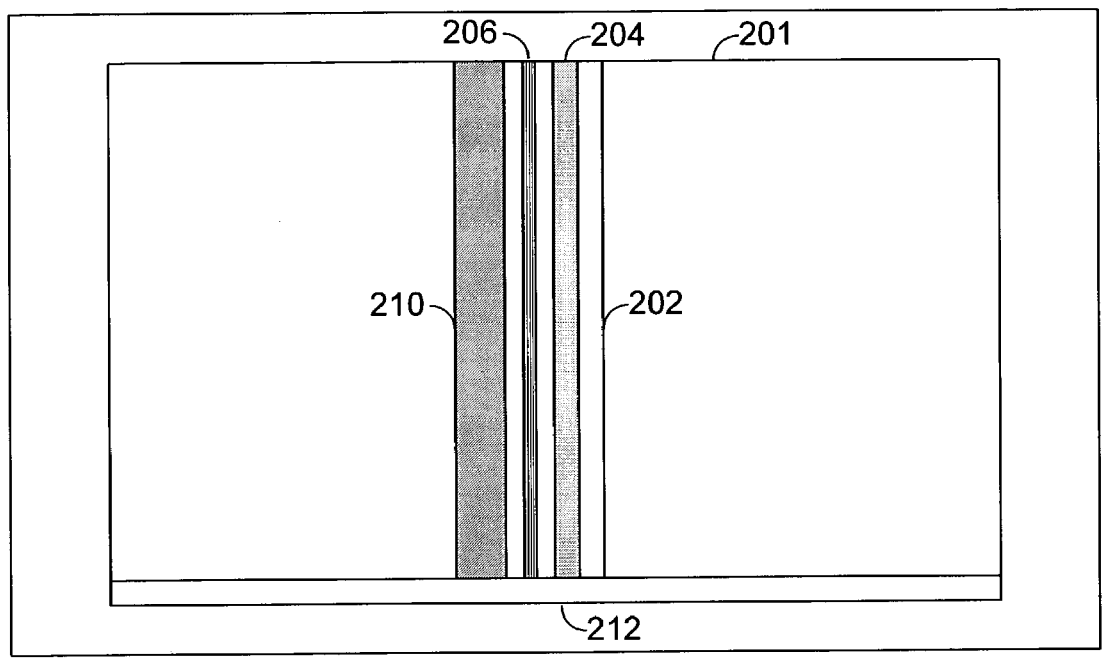
FIG. 2C is a top view of the scanner of FIG. 2A.

FIG. 2C illustrates a top view of the scanner of FIG. 2A, with the document 200 removed. A scanline is defined by a line on the document that is focused onto the photosensor assembly, and for a rod lens array the length of the scanline is essentially the length of the rod lens array. Note that calibration target 210 as illustrated in FIG. 2C is substantially as long as a scanline, as determined by the length of the rod lens array 206. The calibration target 210 does not have to be continuous, and does not have to be as long as the scanline. It is preferable, however, that the calibration target provide lamp intensity and color information at a sufficient number of locations to characterize any nonuniformity of intensity and color along the length of the light source, within the length of the scanline. In particular, for many lamps, it is important to monitor at least near one end of the lamp and the region near the center of the lamp.

Also illustrated in FIG. 2C is an optional calibration target 212. As will be described in more detail below, the optional calibration target 212 may be used to monitor light intensity from one end of the lamp during scanning. As will be described in more detail below, data from calibration target 212 may be used to compute non-linear interpolation. As an alternative to calibration target 212, a small tab on the optical head 202 may be used to monitor light intensity from one end of the lamp during scanning, as taught in U.S. Pat. No. 6,028,681.

Scanning may be performed by moving the optical head 202 relative to the document, or the optical head may remain stationary and the document moved relative to the optical head. For either configuration, before scanning, the calibration target is positioned for calibration. After the scanner obtains calibration data, the calibration target is then positioned to permit scanning. Then, whenever necessary (dependent on lamp stability), scanning may be interrupted, the calibration target may be positioned for calibration, and calibration may be repeated. Optionally, with two sets of calibration values, calibration values may be computed by interpolating between a first set of calibration values and a second set of calibration values. Scanning can start as soon as the lamp provides sufficient light for scanning, without waiting for the lamp to stabilize. It is not necessary to keep the lamp on, or to keep the lamp warm. No separate photosensor array is needed, since the same photosensor assembly 208 is used for image data and for light source calibration data.

The configuration of the optical head 202 illustrated in FIGS. 2A and 2B is for purposes of example only. Light source 204 is depicted as having one lamp, but it is common to have a multiple lamps. In addition, the rod lens array 206 is used for purposes of illustration only. Many scanners use multiple mirrors to fold the light path within the carriage before passing through a focusing lens assembly. Some scanners have moving mirrors. Photosensor arrays commonly comprise three rows of photosensors, one row receiving red wavelengths, one row receiving green wavelengths, and one row receiving blue wavelengths. However, there are many variations, for example, there may be only one row, there may be more than three rows, at least one row may receive white light, or other colors may be sensed. In some scanners, each row of photosensors receives light scattered from a different scanline. In scanners using beam splitters, all rows of photosensors receive light from a single scanline.

Preferably, If there are multiple rows of photosensors, each row or rows dedicated to a particular band of wavelengths is separately calibrated. Then, if the lamp color changes during scanning, the color change is compensated by the calibration and compensation process for each row, as described below.

Figure 1:
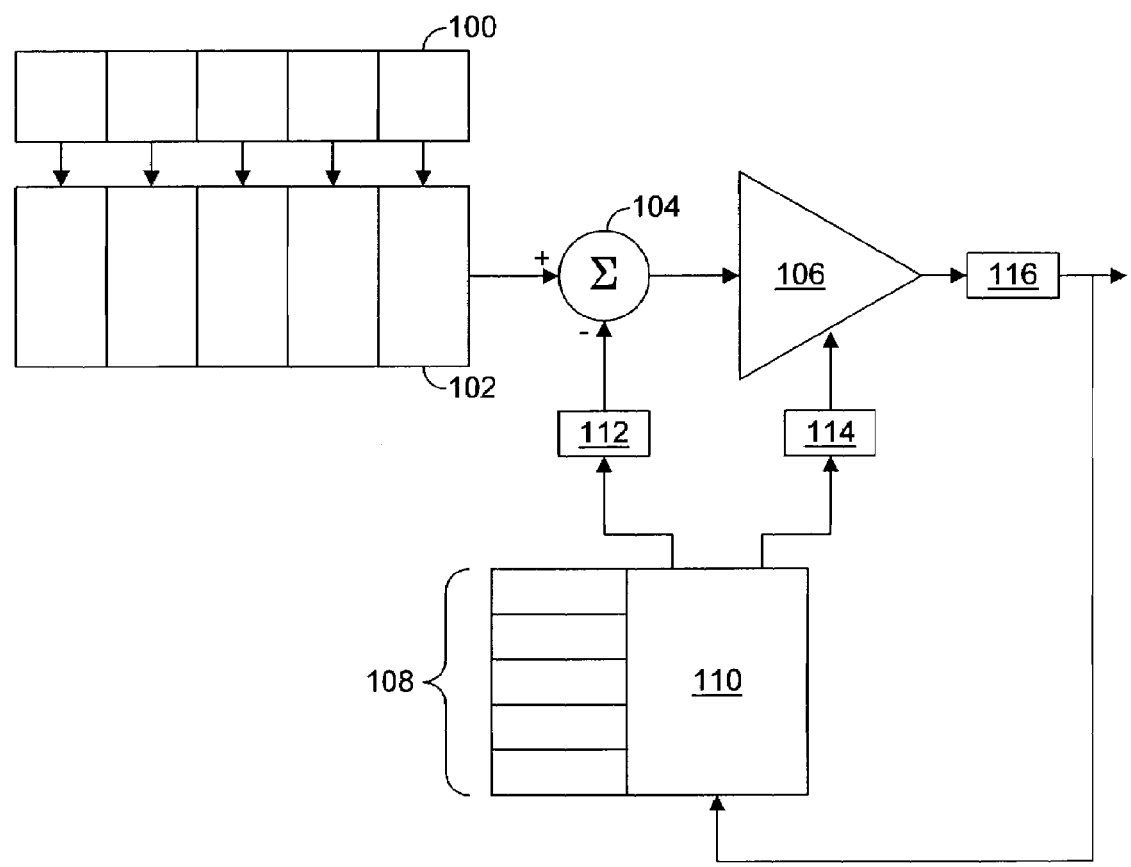
FIG. 1 (prior art) is a block diagram of a system for gain compensation during scanning.

Before scanning, the scanner obtains initial PRNU calibration data, either from calibration target 210, or from a calibration target in a fixed position beneath the platen (not illustrated). With light scattered from the calibration target focused onto the photosensor array, the resulting voltage from each imaging photosensor is measured. If calibration target 210 is used for initial calibration, then calibration target 210 is positioned for scanning, and a portion of the document is scanned. The initial calibration data may or may not be used for gain control during scanning as illustrated in FIG. 1. After scanning a portion of the document, the calibration target 210 is positioned for calibration, and second PRNU calibration data is obtained.

There are multiple options for use of first and second calibration data, depending on lamp stability. For a first option, the first calibration data can be used as illustrated in FIG. 1 for compensation during scanning of a first portion of the document, and first calibration data may then be replaced by second calibration data for use during scanning a second portion of the document. Alternatively, first calibration data can be used during scanning of a first portion of a document, and intermediate interpolated sets of calibration data can be calculated and used to modify the image data from the first portion of the document, as discussed in more detail below. Alternatively, second calibration data can be compared with the first calibration data, and if significant differences exist, then intermediate interpolated sets of calibration data can be calculated and used to modify the image data, as discussed in more detail below. Finally, for any of the above options, optional calibration target 212 may be used to modify calibration data during scanning, as discussed in more detail below.

If interpolation is needed, there are multiple alternative example methods, as follows. For simplicity, compensation for thermal noise (dark current) is not expressly included in the following discussion. That is, each voltage may be assumed to be a voltage that has been corrected for thermal noise, if appropriate.

Assume that for photosensor N, for each color C, the measured voltage during a first PRNU calibration is $V_{FIRST}(N,C)$ and the expected voltage is $V_{EXPECTED}$. Assume that for photosensor N, for color C, the measured voltage during the second PRNU calibration is $V_{SECOND}(N,C)$ and the expected voltage is again $V_{EXPECTED}$.

The first PRNU gain adjustment for photosensor N, for color C, is as follows:

$$G_{FIRST}(N,C) = V_{EXPECTED}/V_{FIRST}(N,C)$$

The second PRNU gain adjustment, for photosensor N, for color C, is as follows:

$$G_{SECOND}(N,C) = V_{EXPECTED}/V_{SECOND}(N,C)$$

For a first alternative, assume that the optional calibration strip 212 is not used. Assume that for each color there are Y total scanlines in the scan area. Linear interpolation may be based on the scanline number. The PRNU gain adjustment, for photosensor N, for each color C, for scanline y, is as follows:

$$G(N,C,y) = G_{FIRST}(N,C) + (y/Y) * [G_{SECOND}(N,C) - G_{FIRST}(N,C)]$$

Alternatively, linear interpolation may be made based on time instead of scanline number. Assume that the first PRNU calibration occurs at time $T_{FIRST}$, that the second PRNU calibration occurs at time $T_{SECOND}$, and data for photosensor N, for color C, in scanline y is obtained at time T(N,C,y). The PRNU gain adjustment, for photosensor N, for each color, for scanline y, is as follows:

$$G(N, C, y) = G_{FIRST}(N, C) + [(T(N, C, y) - T_{FIRST})/(T_{SECOND} - T_{FIRST})] *$$
$$[G_{SECOND}(N, C) - G_{FIRST}(N, C)]$$

Optional calibration target 212, or a small tab on the carriage, may be used to aid interpolation. In particular, calibration target 212 or tab may be used to enable non-linear interpolation during post-scan numerical processing. Assume that multiple photosensors monitor the intensity of the optional calibration target 212. For scanline y, the PRNU of each of the photosensors monitoring calibration target 212 is calibrated. That is, for every scanline, for each photosensor monitoring calibration target 212, given an actual voltage output of $V_{ACTUAL}(N,C)$, a gain is computed as $V_{EXPECTED}/V_{ACTUAL}(N,C)$. The average gain for all the photosensors monitoring calibration target 212, for color C, for the first PRNU calibration is $G_{FIRSTAVERAGE}(C)$. The average gain for all the photosensors monitoring calibration target 212, for color C, for the second PRNU calibration is $G_{SECONDAVERAGE}(C)$. For scanline y, the average gain for all the photosensors monitoring calibration target 212, for color C, is $G_{AVERAGE}(y,C)$. The PRNU gain adjustment for photosensor N, for color C, for scanline y, is as follows:

$$G(N, C, y) = G_{FIRST}(N, C) + [(G_{AVERAGE}(y, C) - G_{FIRSTAVERAGE}C))/$$
$$(G_{SECONDAVERAGE}(C) - G_{FIRSTAVERAGE}(C))] *$$
$$[G_{SECOND}(N, C) - G_{FIRST}(N, C)]$$

The entire gain adjustment in the above equations may be implemented by post-scan numerical processing. Alternatively, the first calibrated gain ($G_{FIRST}(N,C)$) can be used in real time while scanning, as in FIG. 1, and then the remaining portion of each equation can be implemented by post-scan numerical processing (notice in each of the above examples that the first term is $G_{FIRST}(N,C)$). Using the first calibrated gain in real time is preferable because signal-to-noise is improved when the dynamic range of the output of each photosensor is matched to the dynamic range of the associated analog-to-digital converter.

By using multiple PRNU calibrations during scanning a document, scanning can start without having to wait for the lamp temperature to stabilize. However, it is still preferable to minimize any lamp instability. Optionally, lamp instability can be reduced by continuous heating. One possibility is to maintain a low current through the lamp between scans, as discussed in U.S. Pat. No. 5,907,742. Another possibility is use of an external heater. For example, there are commercially available cold cathode fluorescent lamps that have a nichrome wire wrapped around the exterior of the lamp. Such bulbs are available, for example, from Stanley Iwaki Works Co., Ltd., 50 Hamaiba, Shiramizu-Machi, Uchigo, Iwaki-Shi, Fukushima-Ken, 973 Japan. Passing a current through the nichrome wire heats the tube wall. A reflector, for example, FIG. 1, 212, or diffuser, diffuses light sufficiently to provide uniform illumination along a scanline even if part of the surface of the lamp is obscured by a wire.

Figure 3A:
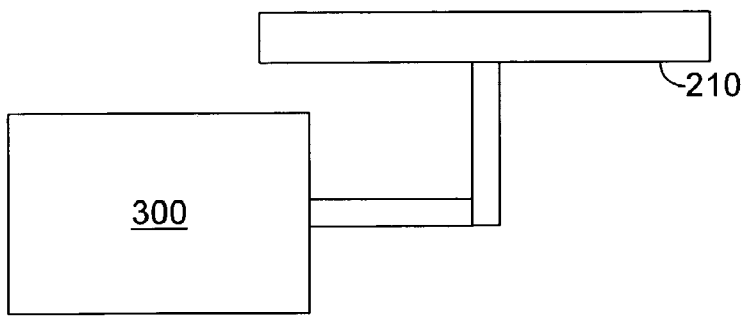
FIG. 3A is a simplified cross section of an example embodiment of a calibration target with active control of position.
Figure 3B:
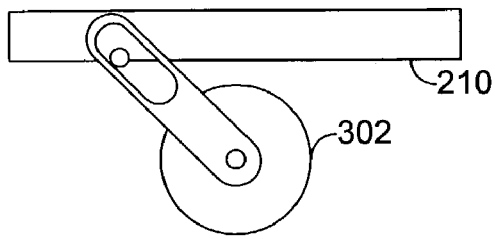
FIG. 3B is a simplified cross section of an alternative example embodiment of a calibration target with active control of position.
Figure 3C:
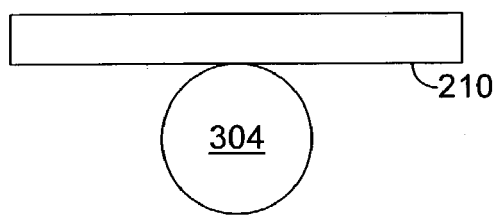
FIG. 3C is a simplified cross section of an alternative example embodiment of a calibration target with active control of position.
Figure 3D:
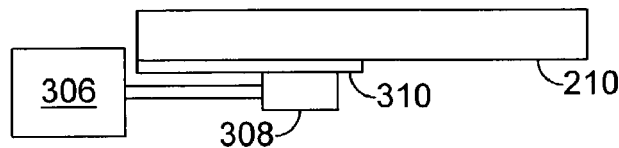
FIG. 3D is a simplified cross section of an alternative example embodiment of a calibration target with active control of position.

There are many suitable alternatives for moving the calibration target 210. In FIG. 3A, a linear solenoid 300 is used to translate the calibration target. In FIG. 3B, a rotary solenoid or motor and a slotted arm drives a pin on the calibration target. In FIG. 3C, the calibration target is driven by a rotary solenoid or motor with a friction wheel 304 or gear. In FIG. 3D, a motor 306 drives a pinon gear 308 which in turn drive a rack on the calibration target.

Figure 4A:
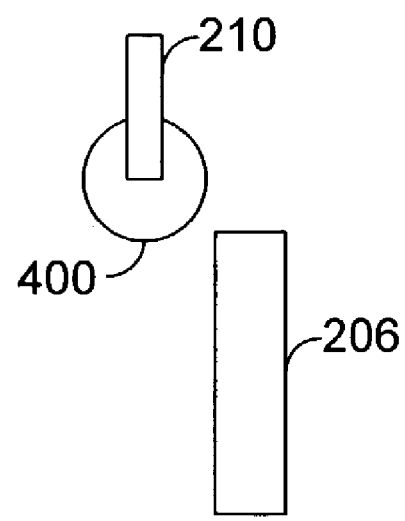
FIG. 4A is a simplified cross section of an example embodiment of a rotating calibration target, where the rotating calibration target is positioned for scanning.
Figure 4B:
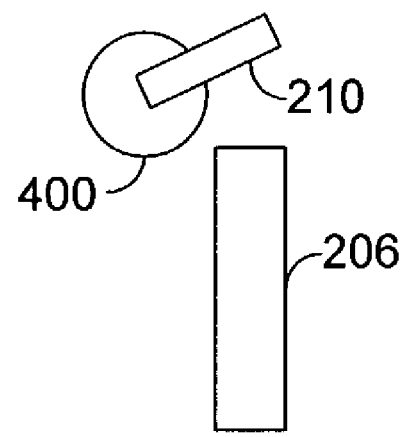
FIG. 4B is the embodiment of FIG. 4A, where the rotating calibration target is positioned for calibration.

Alternatively, the calibration target may be rotated into position. In FIG. 4A, the calibration target is attached to a motor 400 and is a position to permit scanning In FIG. 4B, the calibration target has been rotated into a position for calibration.

Figure 5A:
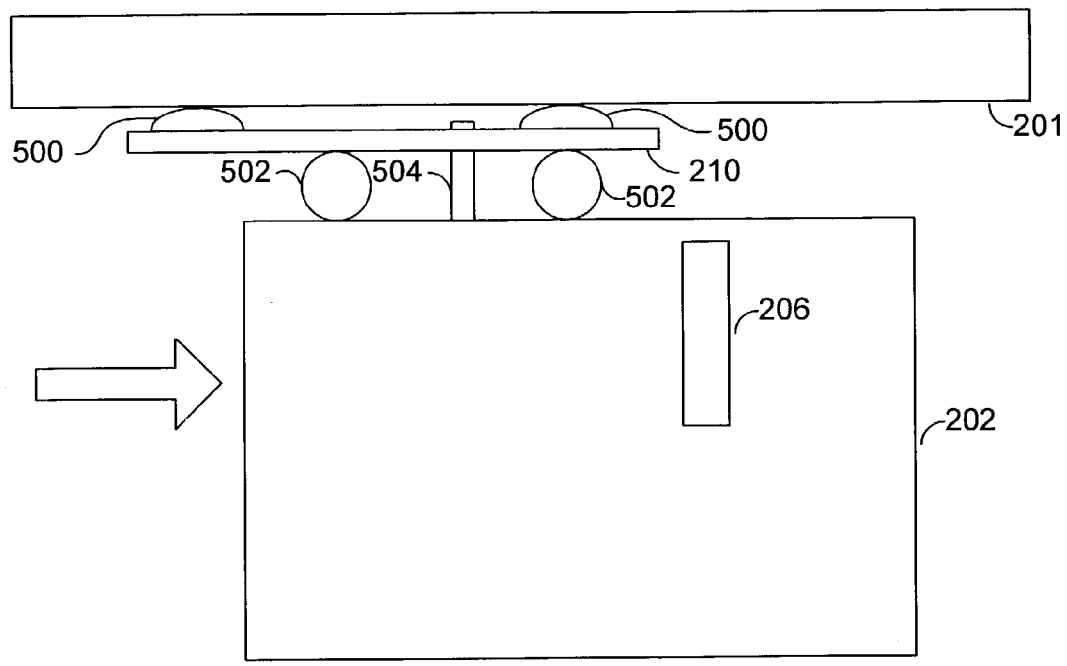
FIG. 5A is a simplified cross section of a scanner illustrating an example embodiment of a calibration target with position controlled by direction of carriage movement.

As still another alternative, direction of motion of the optical head may be used to control the position of the calibration target relative to the scanline. In FIG. 5A, the calibration target includes pads 500 that are pressed against the bottom side of the platen rollers 502 provide very low friction for movement of the calibration target relative to the optical head. At least one pin 504 protrudes into a slot (FIG. 5C, 506) in the calibration target. The pads 500 may be relatively low friction, but the friction on the platen provide a higher force resisting lateral movement of the calibration target than the rollers 502. When the optical head is moving to the right as viewed in FIG. 5A, the pads 500 cause the calibration target to remain stationary relative to the platen until pin 504 hits one end of the slot. As a result, the calibration target is positioned for scanning. When the optical head is moving to the left as viewed in FIG. 5B, the pads 500 cause the calibration target to remain stationary relative to the platen until pin 504 hits a second end of the slot. As a result, the calibration target is positioned for calibration.

Figure 5B:
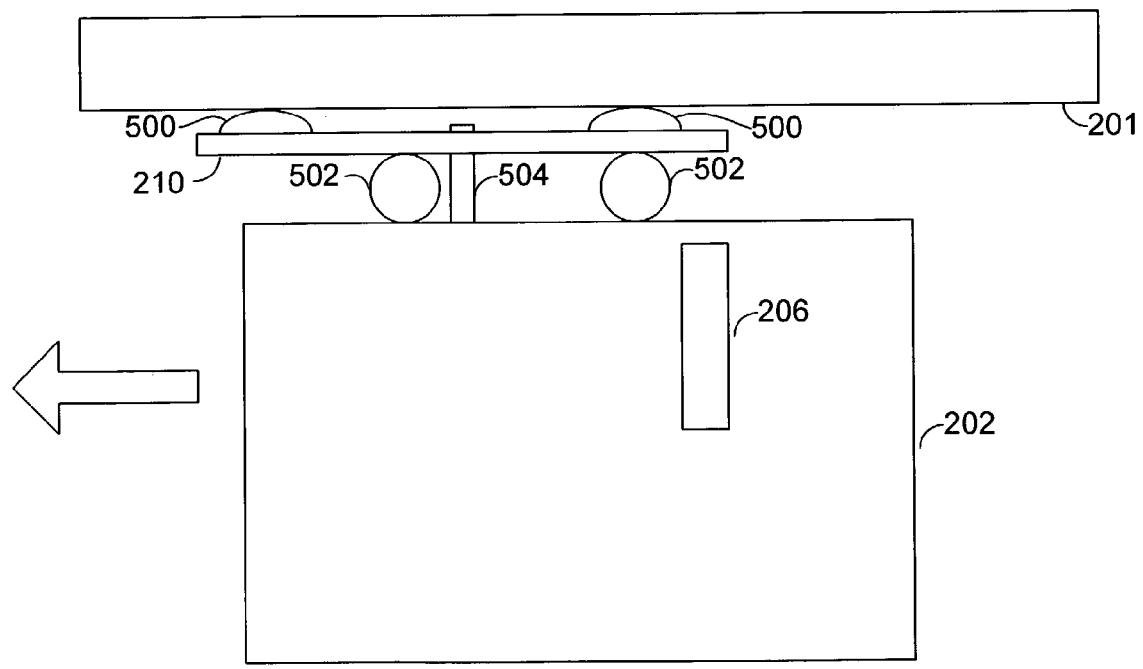
FIG. 5B is the scanner of FIG. 5A with the calibration target positioned for calibration.
Figure 5C:
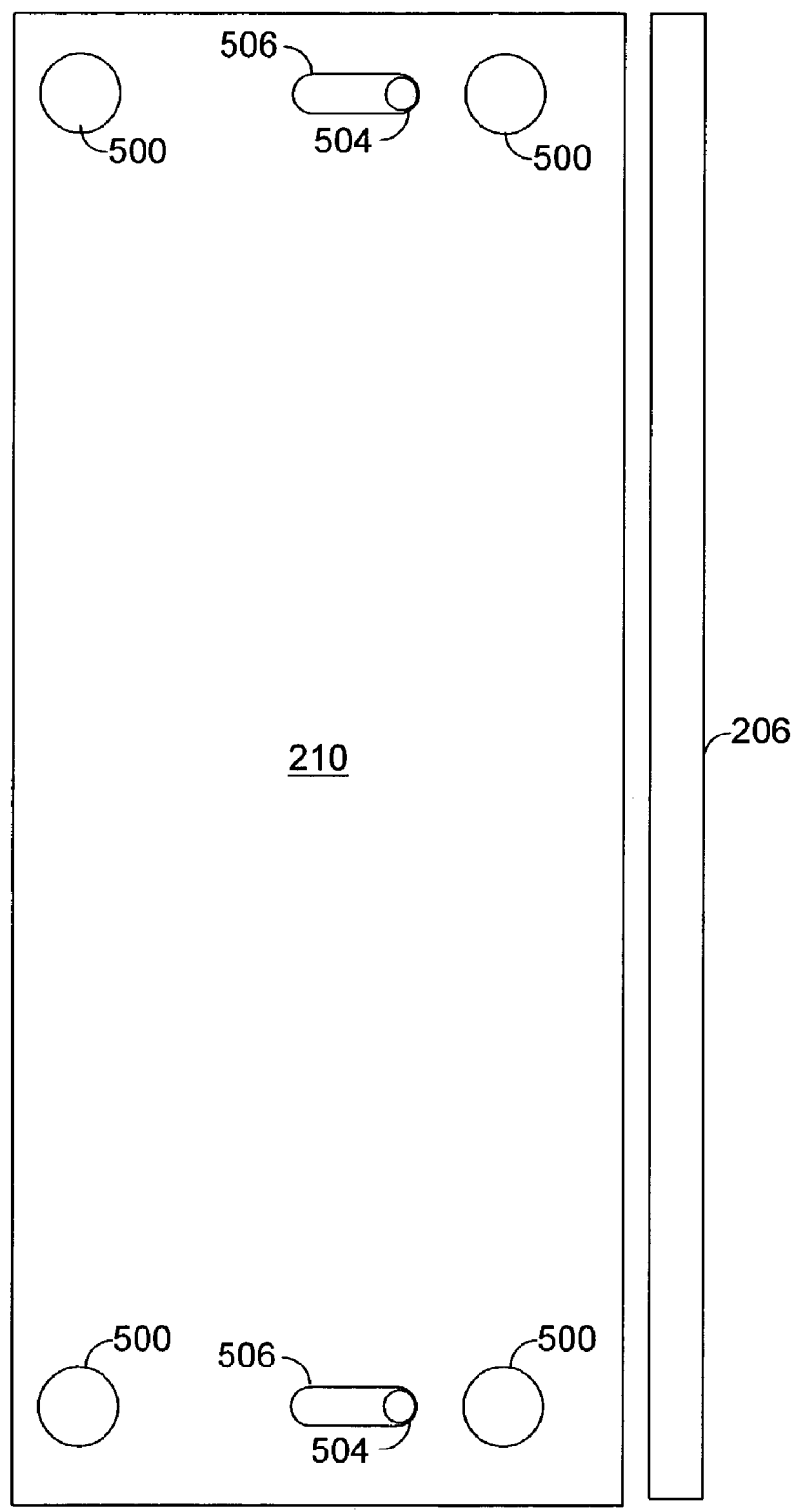
FIG. 5C is top view of part of the scanner of FIG. 5A.
Figure 6:
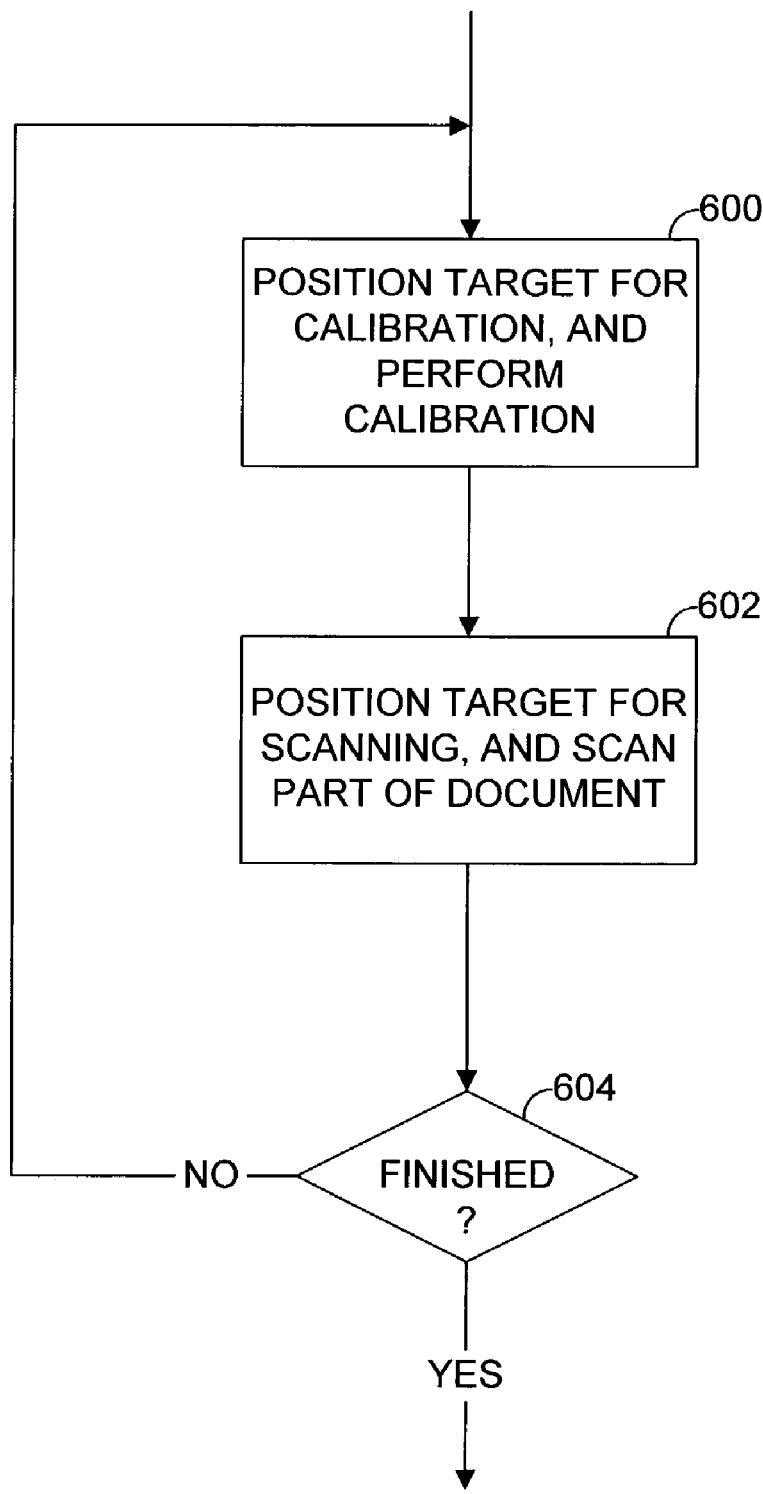
FIG. 6 is a flow chart of an example embodiment of a method for calibration and scanning using a moveable calibration target.

FIG. 6 illustrates an example method for scanning and calibration using a moveable calibration target. In step 600, the calibration target is positioned for calibration, and first calibration data is read from the photosensor assembly. The calibration target may be actively positioned, as illustrated in the examples of FIGS. 3A-3D and 4A-4B. Alternatively, direction of movement of the optical head may be used to position the calibration target, as illustrated in FIGS. 5A-5C. At step 602, the calibration target is positioned for scanning, and a portion of a document is scanned. Again, the calibration target may be actively positioned, or direction of movement of the optical head may be used to position the calibration target. At step 604, if the document has not been completely scanned, then scanning pauses while step 600 is repeated. When step 600 is repeated, the previous calibration data may be saved as first calibration data, and new calibration may be saved as second calibration data, for use in interpolation as discussed above. During scanning in step 602, an optional calibration target may be used for further compensation as discussed above in conjunction with optional calibration target 212.

What is claimed is:
1. An image scanner, comprising:
    a transparent platen;
    an optical head including;
        a light source; and
        a photosensor assembly;

a calibration target positioned between the transparent platen and the optical head, where the calibration target can be moved to at least a first position and a second position, where, when the calibration target is in the first position, the photosensor assembly receives light, from the light source, scattered from a document, and when the calibration target is at the second position, the photosensor assembly receives light, from the light source, that is scattered from the calibration target;

a slot formed in the calibration target, the slot having first and second ends;

a pin connected to the optical head end extending into the slot in the calibration target;

where motion of the optical head causes the pin move within the slot, and when movement of the pin applies force to either the first or second end of the slot, the calibration target is moved into either the first or second position.

2. The image scanner of claim 1, further comprising:
a motor that moves the calibration target.

3. The image scanner of claim 1, further comprising:
a solenoid that moves the calibration target.

4. The image scanner of claim 1, further comprising:
rollers between the calibration target and the optical head to provide a friction for movement of the calibration target relative to the optical head.

5. The image scanner of claim 1, further comprising:
a plurality of pads between the calibration target and the platen to provide frictional contact therebetween.

6. A method, comprising:
moving an optical head assembly including a photosensor assembly, the optical head assembly including a pin that extends therefrom and into a slot formed within a calibration target, where movement where of the optical head causes the pin to move within the slot, and when movement of the pin applies force to either a first or second end of the slot, the calibration target is moved into either the first or second position;

moving the calibration target by moving the optical head assembly toward the first end of the slot so that the photosensor assembly receives light scattered by the calibration target, and obtaining first calibration data;

moving the calibration target by moving the optical head assembly toward the second end of the slot so the photosensor assembly receives light scattered from a document, and obtaining first image data, and modifying the first image data with the first calibration data;

moving the calibration target by moving the optical head assembly toward the first end of the slot so that the photosensor assembly receives light scattered by the calibration target, and obtaining second calibration data; and moving the calibration target by moving the optical head assembly toward the second end of the slot so the photosensor assembly receives light scattered from the document, and obtaining second image data, and modifying the second image data with the second calibration data.

7. The method of claim 6, where modifying the second image data comprises:
modifying the image data using calibration data obtained by interpolation between the first and second calibration data.

8. The method of claim 7, further comprising:
monitoring, by the photosensor assembly during scanning of document, a second calibration target, and obtaining third calibration data; and modifying the image data using the third calibration data.

* * * * *

UNITED STATES PATENT AND TRADEMARK OFFICE
CERTIFICATE OF CORRECTION

PATENT NO.         : 7,433,097 B2                                      Page 1 of 1
APPLICATION NO. : 10/418932
DATED              : October 7, 2008
INVENTOR(S)        : Kurt E. Spears It is certified that error appears in the above-identified patent and that said Letters Patent is hereby corrected as shown below:

On the face page, in field (56), under "Foreign Patent Documents", in column 2,
line 3, below "GB   2303988 A   3/1997"
insert -- JP   06037979 A   2/1994
         DE   4013404        11/1990 --.

On page 2, in field (56), under "U.S. Patent Documents", in column 1,
line 2, below "6,989,915 B2*   1/2006   Honjo et al. ........358/461"
insert -- 2002/0140996 A1   10/2002   Spears et al. --.

In column 9, line 14, in Claim 1, after "pin" insert -- to --.

In column 9, line 36, in Claim 6, after "slot" delete ",".

In column 10, line 32, in Claim 8, after "of" insert -- the --.

Signed and Sealed this

Twelfth Day of May, 2009

JOHN DOLL
*Acting Director of the United States Patent and Trademark Office*